US006643822B1

(12) United States Patent
Murthy

(10) Patent No.: US 6,643,822 B1
(45) Date of Patent: *Nov. 4, 2003

(54) COMPUTER SYSTEM WITH GREATER THAN FIFTEEN DRIVE FAULT TOLERANCE

(75) Inventor: Purna C. Murthy, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/576,666

(22) Filed: May 23, 2000

(51) Int. Cl.[7] .............................................. G11C 29/00
(52) U.S. Cl. ...................................... 714/805; 714/758
(58) Field of Search ................................. 714/718, 800, 714/758, 801, 803, 804, 805, 755; 71/114; 365/201; 707/202; 326/54

(56) References Cited

U.S. PATENT DOCUMENTS 5,959,914 A * 9/1999 Gates et al. ................. 365/201
6,138,125 A * 10/2000 DeMoss ...................... 707/202

OTHER PUBLICATIONS

G.A. Alvarez et al.; *Tolerating Multiple Failures in Raid Architectures with Optimal Storage and Uniform Declustering*; Dept. of Computer Science and Engineering, University of California, San Diego.

M.O. Rabin; *Efficient Dispersal of Information for Security, Load Balancing and Fault Tolerance*; April 1989; pp. 335–348; Journal of the Association for Computing Machinery, vol.36, No. 2.

A. Bestavros; *SETH A VLSI Chip for the Real–Time Information Dispersal and Retrieval for Security and Fault–Tolerance*; 1990; pp.I–457 — I–464; 1990 International Conference on Parallel Processing.

* cited by examiner

Primary Examiner—Albert Decady
Assistant Examiner—Mujtaba Chaudry

(57) ABSTRACT

A computer system with an array of disk drives is disclosed. The drive array is capable of supporting greater than 15 drive fault tolerance accomplished by using coefficients for parity equations spanning greater than eight bits.

22 Claims, 5 Drawing Sheets

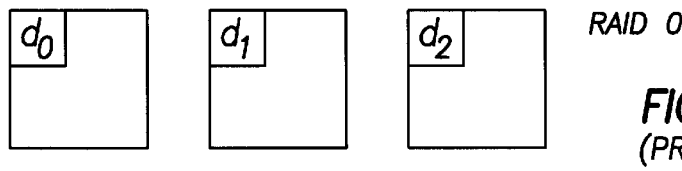
RAID 0
FIG. 1A
(PRIOR ART)
$$\begin{bmatrix} 1 & 0 & 0 \\ 0 & 1 & 0 \\ 0 & 0 & 1 \end{bmatrix} \begin{bmatrix} d_0 \\ d_1 \\ d_2 \end{bmatrix} = \begin{bmatrix} d_0 \\ d_1 \\ d_2 \end{bmatrix}$$
FIG. 1B
(PRIOR ART)
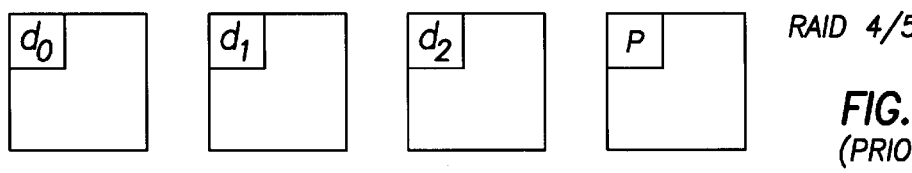
RAID 4/5
FIG. 2A
(PRIOR ART)
$$\begin{bmatrix} 1 & 0 & 0 \\ 0 & 1 & 0 \\ 0 & 1 & 0 \\ 1 & 1 & 1 \end{bmatrix} \begin{bmatrix} d_0 \\ d_1 \\ d_2 \end{bmatrix} = \begin{bmatrix} d_0 \\ d_1 \\ d_2 \\ P \end{bmatrix}$$
WHERE
$P = d_0 \oplus d_1 \oplus d_2$
FIG. 2B
(PRIOR ART)

$$\begin{bmatrix} 1 & 1 \\ \beta & \gamma \end{bmatrix} \begin{bmatrix} d_2 \\ d_3 \end{bmatrix} = \begin{bmatrix} P'_0 \\ P'_1 \end{bmatrix}$$

FIG.4A
(PRIOR ART)

$$\begin{bmatrix} d_2 \\ d_3 \end{bmatrix} = \begin{bmatrix} 1 & 1 \\ \beta & \gamma \end{bmatrix}^{-1} \begin{bmatrix} P'_0 \\ P'_1 \end{bmatrix}$$

FIG.4B
(PRIOR ART)

$$\begin{bmatrix} 1 & 0 & 0 \\ 0 & 1 & 0 \\ 0 & 0 & 1 \\ \alpha & \beta & \gamma \\ \delta & \epsilon & \mu \end{bmatrix} \begin{bmatrix} d_0 \\ d_1 \\ d_2 \end{bmatrix} = \begin{bmatrix} d_0 \\ d_1 \\ d_2 \\ P_0 \\ P_1 \end{bmatrix}$$

WHERE
$P_0 = \alpha\, d_0 \oplus \beta\, d_1 \oplus \gamma\, d_2$
$P_1 = \delta\, d_0 \oplus \epsilon\, d_1 \oplus \mu\, d_2$

FIG.5

COMPUTER SYSTEM WITH GREATER THAN FIFTEEN DRIVE FAULT TOLERANCE

CROSS-REFERENCE TO RELATED APPLICATIONS

Applicant of this application, with others, filed applications related to this subject matter. These applications are Ser. No. 09/576,665 titled "Multiple Drive Failure Recovery for a Computer System Having an Array of Storage Drives", and Ser. No. 09/576,749 titled "Encryption Keys for Multiple Drive Fault Tolerance." Each of these applications are incorporated by reference in this document as if reproduced in full below.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems having multiple storage drives. More specifically, the invention relates to recovering from multiple drive failures in a computer system having an array of storage drives. More specifically still, the invention relates to calculating parity values used for drive fault recovery with parity equation coefficients spanning more than four bits.

2. Background of the Invention

Early computer systems typically had only one hard drive or fixed storage device. Even today, computer systems having a single fixed storage drive are standard for personal computer systems. However, commercial and industrial computer users require greater data stability. That is commercial and industrial computer users want some assurance that information stored on hard disks will not be lost in spite of drive failures.

Some users ensure data stability by performing periodic backups onto tape drive systems. For example, a user may make a complete backup of their hard drive contents on a weekly basis. The user may further make copies of only the changes since the last backup, commonly known as an incremental backup, on a daily basis. However, even this method leaves open the possibility that some information may be lost if there is a failure of the hard drive between data backups. Data stability demands drove computer manufacturers to make computer systems having multiple fixed storage devices.

FIG. 1A represents one approach computer manufacturers take in storing data in a computer system having multiple hard drives. In FIG. 1A, each of the large boxes represents a hard drive in a computer system. One block of data D, being the set of data $[d_0,d_1,d_2]$, is divided into small subsets and distributed across the hard drives of the computer system. Thus, the information is stored on an array of disks. This configuration is commonly known as a Redundant Array of Inexpensive Disks ("RAID"), and may also be known as a Redundant Array of Independent Disks. The system exemplified in FIG. 1A is commonly known as RAID0. The disadvantage of the RAID0 system is that upon failure of any one of the disk drives, the overall data D cannot be recovered. FIG. 1B represents, in matrix format, the storage system of RAID0. Carrying out the matrix multiplication of FIG. 1B reveals that $d_0=d_0$, $d_1=d_1$, and $d_2=d_2$, which is mathematically uneventful, but is important in other systems as described below. As compared to a single hard drive computer system, RAID0 actually increases the probability of data loss in that a failure of any one of the drives results in a complete data loss. RAID0 exemplifies an important concept in multiple disk arrays, that concept being "striping". With reference to FIG. 1A, data D is the of the smaller portions of data being $[d_0,d_1,d_2]$. Placing small portions on each drive of a multiple drive system is known as striping. That is, data is striped across multiple drives.

Manufacturers may address the problem associated with a striped RAID0 system by "mirroring". In a mirrored system, there are duplicate drives containing complete sets of duplicate information. For example, an array of drives may consist of four drives, data D may be striped across two drives, and likewise striped again across the other two drives. In this way, as many as two drives may fail without loss of data, so long as the drive failures are not the drives containing the duplicate information. Fault tolerance implemented in this configuration is known as "RAID1+0", "RAID0+1" or "RAID10." While a RAID1+0 ensures greater data stability over a RAID0 or a single disk system, the overhead associated with implementing such a system is high. In the exemplary system described, the effective storage utilization capacity of the four disk drives is only 50%. What was needed in the industry was a fault tolerance scheme that had a higher storage utilization capacity, which would therefore make it less expensive to implement.

FIG. 2A represents a series of hard drives in a computer system that has the same number of hard drives as described with respect to mirroring, however, this specific system reaches a 75% utilization capacity. In this system the data represented by $D[d_0,d_1,d_2]$ is striped across the first three of the four disk drives. The system of FIG. 2A further writes error correction or parity information to the fourth disk drive. Such a system is referred to as having three data drives and one parity drive. It is noted that having three data drives is merely an exemplary number and more or fewer data drives are possible. However, fewer data drives translates into lower storage utilization. Likewise, a greater number of data drives represents higher storage utilization. Indeed, as the number of data drives significantly increases, with one parity drive, it is possible that the storage utilization may approach, but never actually reach, 100%.

The subset of data written to the parity drive of FIG. 2A is related to the data written to each of the data drives. FIG. 2B shows the relationship, in matrix format, of each data subset written to the data drives and the value of the parity subset written to the parity drive. Carrying out the matrix multiplication of FIG. 2B reveals that $d_0=d_0$, $d_1=d_1$, $d_2=d_2$ and $P=d_0 \hat{} d_1 \hat{} d_2$, where "^" represents the logical exclusive-OR (XOR) function. Thus, as is indicated in the figure and shown above, the value of the parity subset is the XOR of each of the smaller subsets of the overall data. A system implementing the configuration of FIGS. 2A, 2B is capable of recovery from a single drive failure. Loss of the parity drive does not affect stability of the data. However, loss of any one of the data drives is a recoverable error inasmuch as the data lost on the failed drive may be calculated using the remaining subsets of information in combination with the parity information. Such a fault tolerance scheme is known as RAID4.

In a RAID4 system any write operation to any of the data drives also requires a write to the parity drive. This is true even if only one of the data drives is written. In the three data drive system exemplified in FIG. 2A, data throughput is not significantly hampered by this requirement. However, as the number of data drives increases system performance suffers as write commands to the parity drive accumulate.

In computer systems requiring more than a handful of data drives, the RAID4 system is less desirable because of the throughput capabilities associated with queuing of write requests at the parity drive. Manufacturers address this problem by rotating the parity drive. That is, rather than having designated data and parity drives, the particular hard drive containing the parity information shifts for each block of parity data. Such a distributed parity system is known as RAID5. Although parity information is written for each write of a subset of data, no one hard drive becomes the for all those parity writes. In this way, system throughput is not limited by one parity drive having numerous writes stacked in its input queue.

The disk arrays discussed to this point may each have desirability in particular systems. That is to say, a RAID5 system may be overkill for an application where there is a somewhat limited amount of data to be stored. It may be more economical in this circumstance to implement a RAID1 system. Likewise, where large amounts of data must be stored, a RAID5 may be more desirable.

Except for the two-drive mirroring technique discussed with respect to RAID1, the systems discussed to this point have only had the capability of recovering from a single drive failure in the array. For systems having a relatively small number of hard drives, the ability to recover from a single drive failure may be sufficient. However, as the number of drives increase in a disk array system, the capability to recover from a single drive failure may not sufficiently protect data integrity. For example, if a computer system has an array of 10 disks, the probability of having a second drive fail before a user fixes a first drive failure is significantly greater than for a three disk system. Thus, for computer system users requiring large arrays of hard disk drives, the capability to recover from multiple drive failures is desirable.

FIG. 3A exemplifies a computer system having six data drives and two parity drives. By having two parity drives the overall disk array has the ability to recover from the failure of up to two data drives. For ease of description, the hard drives exemplified in FIG. 3A are drawn in the RAID4 format. That is, the figure shows six distinct data drives and two distinct parity drives. However, it will be understood that while this system may be operational in this configuration, most manufacturers distribute the parity function across all the drives as discussed with respect to the RAID5 format. Also, only six data drives are shown. Prior art RAID systems support up to data drives in addition to the parity drives. FIG. 3B shows, in matrix form, the relationship between the subsets of data $[d_0 \ldots d_5]$ to the values of the two parity blocks. The equation representing the values of parity block zero, $P_0$, is merely an extension of the parity block as calculated and described with respect to the RAID4/5 system. However, the description of the equation for calculating the second parity block, $P_1$, requires further description that must begin with a brief digression into linear algebra.

As is well known in mathematics, in systems of linear equations it is possible to solve for X number of unknown variables so long as there are X number of linearly independent equations. Linear independence means that each equation describes different information. Applying this concept to the array of hard disks exemplified in FIG. 3A, each parity block or value needs to contain information that is not related to the other blocks such that given two hard drive failures, for this system, there are two linearly independent equations from which data for the two failed drives may be calculated. Stated otherwise, and referring to FIG. 3B, the coefficients for the second parity equation, $P_1$, being represented in the figure as $\alpha$, $\beta$, $\gamma$, $\delta$, and $\epsilon$, are chosen such that the equations defining each of the parity blocks are linearly independent. The problem may be somewhat exemplified by assuming for sake of argument that $\alpha$, $\beta$, $\gamma$, $\delta$, and $\epsilon$ are assigned a value of 1. Thus, the parity equations of the exemplary system using the assumption are:

$$P_0 = d_0 \hat{\ } d_1 \hat{\ } d_2 \hat{\ } d_3 \hat{\ } d_4 \hat{\ } d_5 \hat{\ }$$

$$P_1 = d_0 \hat{\ } d_1 \hat{\ } d_2 \hat{\ } d_3 \hat{\ } d_4 \hat{\ } d_5 \hat{\ }$$

As is seen, the equation representing the parity value $P_0$ exactly matches the equation representing the parity value $P_1$. Therefore, using this assumption only one equation exists and the missing data cannot be calculated. for purposes of explanation that the system of FIGS. 3A, 3B has failures of two drives, the drives that hold data subsets $d_2$ and $d_3$. FIG. 4A represents the matrix solution for determining missing data from drives $d_2$ and $d_3$ given the configuration of FIG. 3A. $P_0'$ and $P_1'$ are the equations for the parity information $P_0$ and $P_1$ solved for the missing components $d_2$ and $d_3$ respectively. Solving for the unknown data $d_2$ and $d_3$ involves taking the inverse of the 2×2 matrix and multiplying it by $P_0'$ and $P_1'$ as shown in FIG. 4B. However, not all matrices are invertable. A matrix may be inverted only if the coefficients of each row are linearly independent from the coefficients of all the other rows. Thus, stating that the 2×2 matrix given in FIG. 4A is invertable is equivalent to saying that the equations that the 2×2 matrix represents are linearly independent as discussed above. Therefore, selecting the variables $\alpha$, $\beta$, $\gamma$, $\delta$, and $\epsilon$ etc. is critical to ensuring linear independence. However, problem arises in the prior art related to the size of these coefficients. The problem relates to the physical size of the resultant of the coefficient multiplied by the data subsets.

It is desirable to have the size of the parity data match the size of the data subsets written to each drive. With reference to a RAID4 format, the size of the data written to the parity drive should equal the data subset size. In this way, the parity drive may have the same physical capacity as the data drives. If this were not the case, the parity drives in the RAID4 format would have to be significantly larger than the data drives. Indeed, the size of the parity drive would increase dramatically as the coefficients increased in value. Rather than implement the hardware in this manner, the prior art addresses multiplication by the coefficient with a system such that any four bit number multiplied by a four bit number results in an equally sized four bit number. This is accomplished by a technique known as datum.

Datum is a four bit encryption method with the characteristic that the multiplication of two four bit numbers has a resultant of four bits. Datum uses a four bit encryption key to encrypt the result of the multiplication of the coefficient with the data subset where the resultant encrypted number only resides in four bits of space. This ensures the size of the parity blocks matches the size of the data subsets. However in using the four bit scheme there are only fifteen possible coefficients for use in creating linearly independent equations.

BRIEF SUMMARY OF THE INVENTION

The preferred embodiment of the invention uses eight bit coefficients to generate systems of linearly independent equations. These linearly independent equations are used to generate parity or error correction information as well as for recovering from multiple drive faults. Using eight bit coefficients, up to 255 drive fault tolerance is supported.

Thus, using eight bit coefficients, the problem of supporting more that 15 drive fault tolerance of the prior art is solved.

BRIEF DESCRIPTION OF THE DRAWINGS

For a detailed description of the preferred embodiments of the invention, reference will now be made to the accompanying drawings in which:

FIG. 1A shows a three-drive RAID0 system;

FIG. 1B shows a mathematical relationship in matrix format for the RAID0 system;

FIG. 2A shows an exemplary RAID4/5 system;

FIG. 2B shows the mathematical relationship of the data and parity information, in matrix format, for the RAID4/5 system;

FIG. 4A shows a matrix solution for determining missing data given two drive failures of the system of FIG. 3A;

FIG. 4B shows a reduced matrix solution for finding missing data for two failed drives for the system of FIG. 3A;

FIG. 5 shows the mathematical relationship, in matrix format, of an exemplary system having three data drives and two parity drives;

NOTATION AND NOMENCLATURE

Figures 3A, 3B:
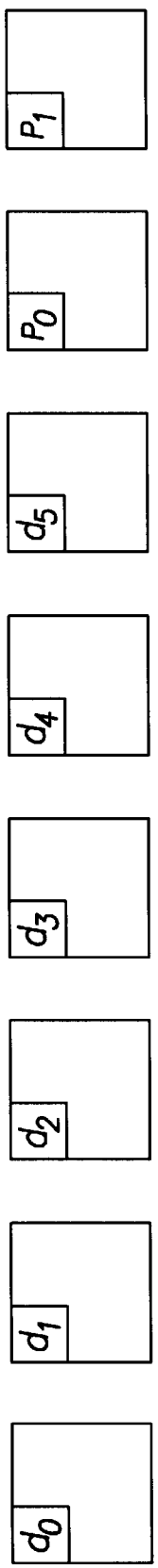
FIG. 3A exemplifies a two-drive fault tolerant scheme.
FIG. 3B shows the mathematical relationship of the data and parity information, in matrix format, for the system exemplified in FIG. 3A.

Certain terms are used throughout the following description and claims to refer to particular system components. As one skilled in the art will appreciate, computer companies may refer to a component by different names. This document does not intend to distinguish among components that differ in name but not in function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. Also, the terms "parity value" and "parity equation" should not be confused. Strictly speaking, an error correction or parity value of the preferred embodiment is a value calculated based on at least data values. The parity value calculation is done by means of a parity equation. Thus, solving a parity equation for missing data means reading a stored parity value, as well as non-missing data, and calculating, using the parity equation, the missing value or values.

DESCRIPTION OF THE PREFERRED EMBODIMENTS

As described above, four bit datum is used in the prior art to perform multiplication that has an encrypted answer such that the multiplication of any four bit number by another four bit number has a resultant of a four bit number. A four bit binary system may represent up to 16 possible numbers, [0, 1, . . . , 14, 15]. In creating sets of linearly independent equations, only 15 of these numbers are useful, those being [1, 2, . . . , 14, 15].

FIG. 5 shows, in matrix format, an exemplary system having three data drives and two parity drives. Using the datum method, each of the coefficients $\alpha, \beta, \gamma, \epsilon$ and $\mu$ may be chosen from the set of numbers [1, 2, . . . , 14, 15]. Sampling theory reveals that since each of these coefficients may take one of 15 possible values, for the three drive system exemplified mathematically in FIG. 5, there are 3,375 unique combinations of these coefficients. As the number of coefficients in the parity equation grows (that is, as the number of data drives increases), the number of unique combinations of those coefficients grows. Thus, facially it appears a four bit datum system is capable of handling a large number of drive fault tolerance, far beyond 15, because of the number of unique combinations of the coefficients. However, four bit datum will not work for disk array systems requiring more than 15 drive fault tolerance.

As explained in the background section, to solve for m number of unknown variables requires m number of linearly independent equations. Stated otherwise, the matrices representing the coefficients of the equations defining those variables must be invertable. Although there may be a large number of unique combinations of coefficients when those coefficients can take numbers in the set of [1, 2, . . . , 14, 15], not all of these unique combinations are linearly independent. For example, an equation where each coefficient has a value of one is not linearly independent from an where each coefficient is 15. In systems where greater than 15 drive fault tolerance is desired, the four bit datum system is not adequate in that the coefficients of datum only define 15 linearly independent equations.

The preferred embodiment addresses the limitations of the datum system by use of an eight bit coefficient system. That is, the coefficients used to generate the linearly independent equations for parity or error correction values are preferably values that may be represented by eight bit numbers. It will be understood that any number of bits over four may be used, however, and still be within the contemplation of this invention.

By using coefficients spanning eight bits, 255 unique coefficients are available. That is, an eight bit number may represent 256 values in the set of [0, 1, 2, . . . , 254, 255]. However, in choosing coefficients to define linearly independent equations, the coefficient zero is not a viable option. Thus, the available coefficients in the eight bit system are [1, 2, . . . , 254, 255]. Although there are thousands of possible unique combinations of these 255 coefficients, they may only be arranged into 255 linearly independent equations defining parity information. That is, using the eight bit coefficient method, a user may define up to 255 linearly independent equations for the calculation of parity values and therefore such a system could support up to 255 drive fault tolerance. It will be understood that any number of bits greater than four may be used to define coefficients, e.g. nine or ten and therefore a greater number of drive fault tolerance would be available, and these selections would still be within the contemplation of this invention.

Calculations using the eight bit coefficients, that is multiplying data subsets by eight bit coefficients in finite field arithmetic, is similar to the datum method of multiplying four bit coefficients. The finite field arithmetic method is described below. Let X be a set of bits for one coefficient, with a leading zero, in an equation that defines a parity value. Thus, X is $[0\ x_n\ X_{n-1} \ldots x_1\ x_0]$ for n greater than 4, and preferably n=8. Let Y be a set of bits being an individual subset of data, with a leading zero. Thus, Y is $[0\ y_n\ Y_{n-1} \ldots y_1\ y_0]$ for n the same as defined with respect to X. Next, let W be a set of bits representing the encrypted resultant of the multiplication of X and Y. Thus, W is $[0\ w_n\ w_{n-1}\ \ldots\ w_1\ w_0]$ for n the same as defined with respect to X. Finally, let K be an n bit encryption key used to make the multiplication of the n-bit X and the n-bit Y having an encrypted resultant of n-bits. Thus, K is $[1\ k_n\ k_{n-1}\ \ldots\ k_1\ k_0]$.

Although for n =8 there are 256 possible encryption key values, not all these 256 values are viable encryption keys. Indeed, out of the 256 numbers that may be represented in an eight bit binary system, only thirty are viable encryption keys. That is, only thirty of the 256 possible numbers are encryption keys that produce valid results in the finite field encrypted resultant multiplication. Which of theses numbers are valid, and therefore may be used as encryption keys K, is the subject of co-pending application titled, "Encryption Keys For Multiple Drive Fault Tolerance," Ser. No. 09/576, 749 filed May 23, 2000. That document is hereby incorporated by reference and the disclosure therein is a part of this specification as if reproduced in full below.

The algorithm to perform the finite field encrypted resultant multiplication of X and Y is as follows:

Step (0) Initialize $\lambda$=0 and W =0 (that is, each of the n-bits of the resultant initialized to zero);

Step (1) Shift left W by one bit;

Step (2) If the most significant bit of the shifted W, that is $w_n$ the first time through, $w_{n-1}$ the second time through, etc., is equal to a logic "1", perform an XOR operation of the modified W with K to make a temporary resultant R;

Step (3) If $Y\lambda$ ="1", perform an XOR operation of the temporary number R with X, and place the resultant in W.

Repeat steps (1) though (3) $\lambda$ number of times, for $\lambda$=n to 0.

Thus, in the preferred embodiment, coefficients used to calculate parity values span greater than four bits. For example, and referring to FIG. 5, the coefficients $\alpha$, $\beta$, $\gamma$, $\epsilon$, and $\mu$ are chosen from the set of [1, 2, . . . , 254, 255], numbers that may be represented in an eight bit system. It will be understood however that using eight bit coefficients in defining parity values allows for up to 255 drive fault tolerance, even though FIG. 5 only exemplifies three.

Figure 6:
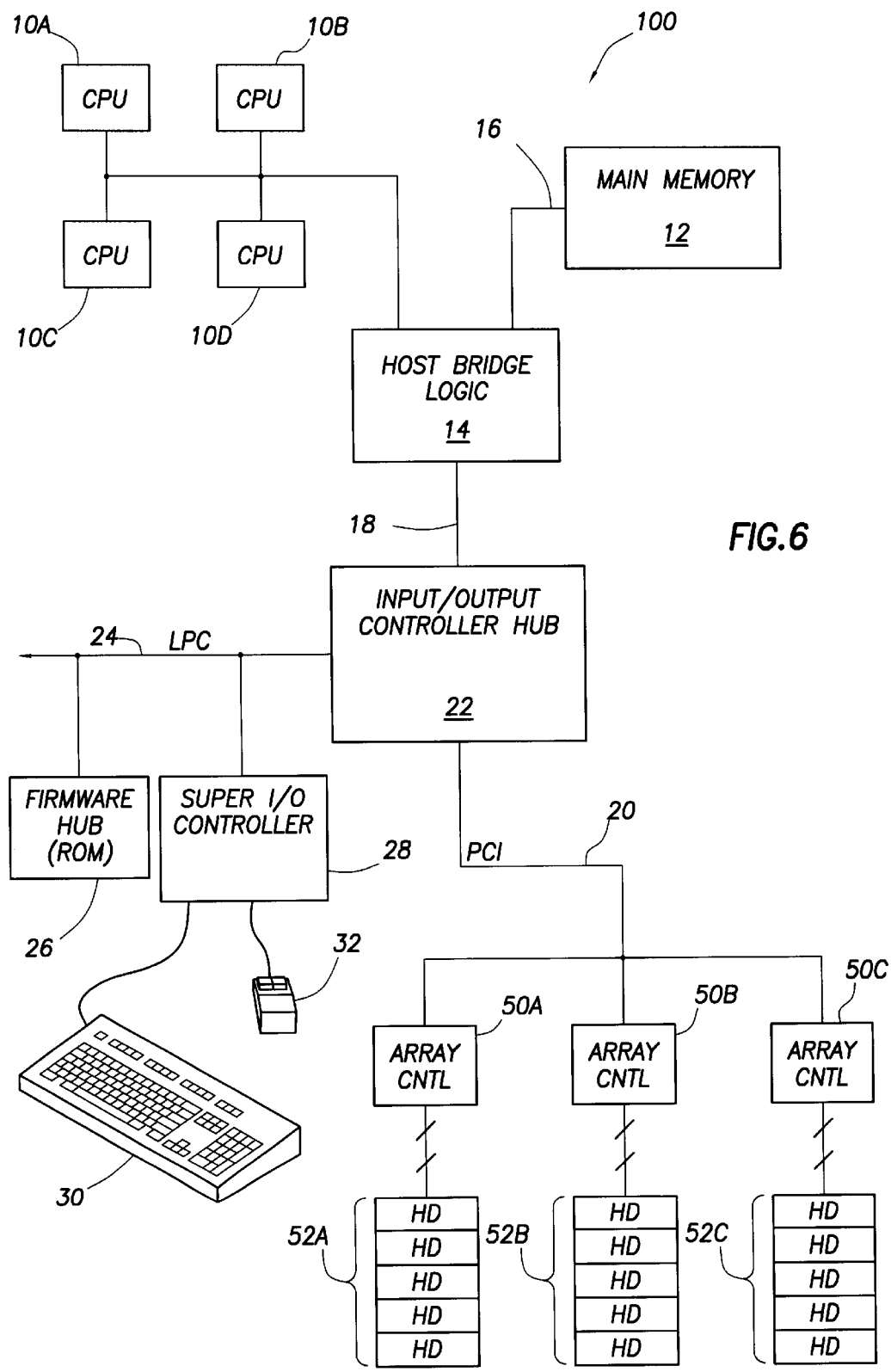
FIG. 6 shows a computer system of the preferred embodiment.

Referring now to FIG. 6, computer system 100 in accordance with the preferred embodiment comprises at least one CPU 10. Inasmuch as computer system 100 is preferably a server system, the computer system 100 preferably comprises multiple CPUs 10A, 10B, 10C, 10D arranged in a configuration where parallel computing may take place. The CPU array 10 couples to a main memory array 12 and a variety of other peripheral computer system components through an integrated host bridge logic device 14. The CPU array 10 may comprise, for example, a plurality of Pentium® III microprocessors. It should be understood, however, that computer system 100 could include other alternative types and numbers of microprocessors. Additionally, other architectures could be used if desired. Thus, the computer system may implement other bus configurations and bus bridges in addition to, or in place of, those shown in FIG. 6.

The main memory array 12 preferably couples to the host bridge logic 14 through a memory bus 16, and the host bridge logic 14 preferably includes a memory control unit (not shown) that controls transactions to the main memory 12 by asserting the necessary control signals during memory accesses. The main memory 12 functions as the working memory for the CPUs 10 and generally includes a conventional memory device or array of memory devices in which program instructions data are stored. The main memory array 12 may comprise any suitable type of memory such as Dynamic Random Access Memory ("DRAM") or any of the various types of DRAM devices such as Synchronous DRAM ("SDRAM"), Extended Data Output DRAM ("EDO DRAM"), or Rambus™ DRAM ("RDRAM").

Inasmuch as computer system 100 is preferably a server system, the computer system 100 may not have a dedicated display device. If the computer system did have a dedicated display device, such a system could be implemented by coupling a video driver card to the host bridge 14 by way of an Advanced Graphics Port bus or other suitable type of bus. Alternatively, the video driver card could couple to the primary expansion bus 18 or one of the secondary expansion buses, for example, the PCI bus 20. If the computer system had a dedicated display device, the video driver or graphic controller would couple to a display device. That display may comprise any suitable electronic display device upon which any image or text can be represented.

Figure 7:
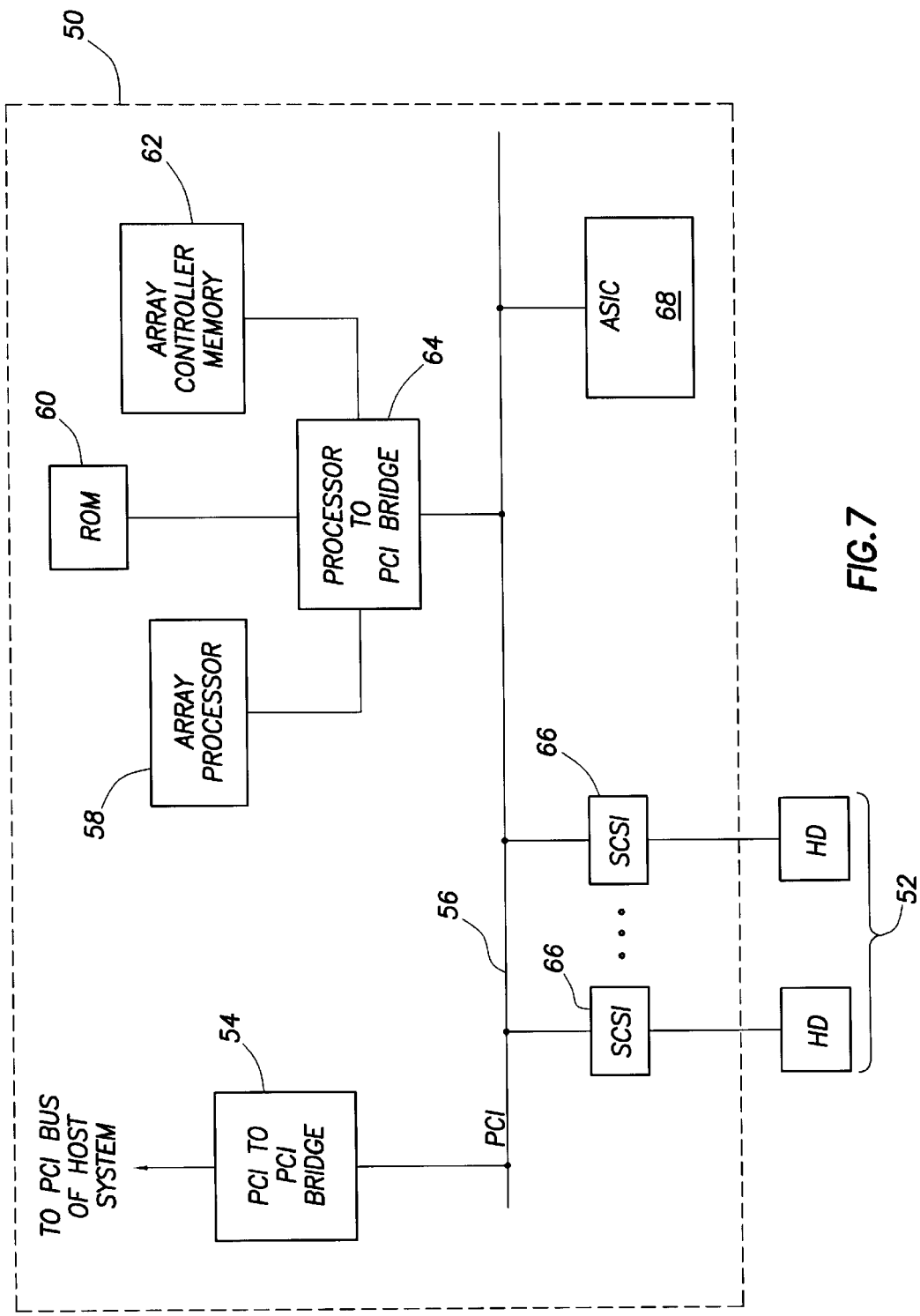
FIG. 7 shows an array controller of the preferred embodiment.

The computer system 100 preferably comprises another bridge logic device which may be an Input/Output Controller Hub ("ICH") 22 that bridges the primary expansion bus 18 to various secondary buses including a low pin count ("LPC") bus 24 and a peripheral component interconnect ("PCI") bus 20. Although the ICH 22 of FIG. 7 is shown only to support the LPC bus 24 and the PCI bus 20, various other secondary buses may be supported by the ICH 22.

In the preferred embodiment shown in FIG. 6, the primary expansion bus 18 comprises a Hub-link bus which is a proprietary bus of the Intel Corporation. However, computer system 100 is not limited to any particular type of primary expansion bus, and thus other suitable buses may be used.

Referring still to FIG. 6, a firmware hub 26 couples to the ICH 22 by way of the LPC bus 24. The firmware hub 26 preferably comprises Read Only Memory ("ROM") which contains software programs executable by the CPU array 10. The software programs preferably include programs to implement basic input/output system ("BIOS") commands, and instructions executed during and just after Power On Self Test ("POST") procedures.

A Super Input/Output controller 28 couples to the ICH 22 and controls many system functions including interfacing with various input and output devices such as keyboard 30. The Super I/O controller 28 may further interface, for example, with a system pointing device such as a mouse 32, various serial ports (not shown) and floppy drives (not shown). The Super I/O controller is often referred to as "super" because of the many I/O functions it may perform.

Also shown in the computer system 100 of FIG. 6 are three array controllers 50A, 50B, 50C coupled to the ICH 22 by way of the PCI bus 20. Each array controller 50 couples to a plurality of hard drives 52A, 52B, 52C. Thus, the array controller 50 preferably performs data reads, data writes and other necessary data manipulation to implement a RAID system including necessary calculations required to ensure drive failure recoverability and calculating missing data in the event of drive failures. It will be understood that while FIG. 6 shows only three array controllers 50, computer system 100 may support any number of these controllers.

FIG. 7 shows the preferred structure of array controller 50 for use in the preferred embodiment of this invention. The array controller 50 preferably couples to the remaining system by way of the PCI bus 20 via a PCI to PCI bridge 54. The array controller 50 therefore has a local PCI bus 56, where the term "local" refers to the PCI bus residing within the array controller 50. The array controller also preferably has an array processor 58 coupled to a read only memory 60 and an array controller 62 by way of a processor to PCI bridge 64.

The array processor 58 preferably performs functions specific to the functionality of the array controller 50. That is, the array processor 58, executing programs stored on the ROM 60 in the memory work space 62 for the array controller, performs functions necessary to operate a RAID system. The array processor 58 may comprise a Power PC® 740 processor manufactured by IBM. However, other microprocessors and even microcontrollers may be used as the array processor 58 and still be within the contemplation of this invention. The array processor 58 couples to a plurality of hard drives 52. Each hard drive of the plurality of hard drives 52 has a dedicated disk interface 66, which could be a Small Computer System Interface ("SCSI") component. FIG. 8 only shows two hard drives 52 and two SCSI components 66; however, the array controller 50 can and preferably does have more hard drives 52, with each hard drive 52 having a dedicated SCSI component.

The calculations the array controller 50 makes to generate parity information and, when necessary, solving simultaneous equations to replace information lost because of failure of particular hard drives, is calculation intensive. To aid the array processor 58 in making these calculations, array controller 50 further preferably comprises an Application Specific Integrated Circuit ("ASIC") 68. The ASIC 68 of the preferred embodiment has the ability to perform multiple XOR operations simultaneously so that operational load on the array processor 58 is such that writes and reads to and from the array of disk drives completes with minimal delay. It is noted that ASIC 68 is not a required element; indeed, the calculations may be performed in software running on array processor 58 without the aide of ASIC 68.

In operation, the writing and reading of data to the fault tolerant drives is relatively transparent to the CPUs 10 of the computer system 100. Preferably, the array controller 50 receives data and performs the necessary operations to store that data in the array of drives 52 to which it is attached.

The above discussion is meant to be illustrative of the principles and various embodiments of the present invention. Numerous variations and modifications will become apparent to those skilled in the art once the above disclosure is fully appreciated. For example, while the disk array controller has been disclosed as having a dedicated microprocessor and main memory, it is possible that the microprocessor could be replaced with a microcontroller. Microcontrollers may have on board memory which cold alleviate the need for disk array working memory. Further, the disk array controller is disclosed as having a plurality of SCSI interfaces coupling to drives of the drive, however any bus system that implements communication to a fixed disk storage device may work equally well. It is intended that the following claims be interpreted to embrace all such variations and modifications.

What is claimed is:

1. A computer system comprising:
   a processor;
   a main memory coupled to the processor via a host bridge device; and
   an array controller coupled to said processor via a secondary expansion bus, wherein said array controller is adapted to perform greater than four bit encrypted resultant multiplication in multiplying parity equation coefficients and write data to determine error correction data for storage device fault recovery.

2. The computer system as defined in claim 1 wherein said array controller further comprises:
   a bridge device that couples to the secondary expansion bus;
   an array controller processor coupled to an array controller main memory;
   an interface circuit coupled to said bridge devices by way of an array controller bus, said interface circuit couples to storage devices;
   an application specific integrated circuit ("ASIC") coupled to the array controller bus, said ASIC adapted to calculate data error recovery information, and wherein said ASIC is adapted to perform the greater than four bit encrypted resultant multiplication in calculating said data error recovery information.

3. The computer system as defined in claim 2 wherein said array controller bus comprises a peripheral components interconnect (PCI) bus.

4. The computer system as defined in claim 2 wherein said secondary expansion bus comprises a PCI bus.

5. The computer system as defined in claim 2 wherein said interface circuit further comprises a small computer system interface (SCSI) circuit.

6. The computer system as defined in claim 2 wherein said ASIC further adapted to perform eight bit encrypted resultant multiplication.

7. A method of operating a plurality of storage devices in an array having multiple device fault tolerance comprising:
   calculating error correction information using greater than four bit
   coefficients to facilitate said fault tolerant recovery capability.

8. The method as defined in claim 7 further comprising calculating error correction information using eight bit coefficients.

9. The method as defined in claim 8 further comprising:
   dividing a block of data into data subsets;
   writing the data subsets to a plurality of data storage devices;
   calculating error correction information based on each data subset; and
   writing error correction information to at least one parity storage device.

10. An array controller that couples to a host computer system, comprising:
    a processor;
    a main memory coupled to said processor;
    a bridge device coupled to said processor by way of an array controller bus, said bridge device adapted to couple the array controller to a host computer system;
    an interface circuit coupled to said processor, said interface circuit couples to a plurality of storage devices; and
    said array controller adapted to calculate parity information using greater than four bit coefficients.

11. The array controller as defined in claim 10 wherein said processor further comprises a microprocessor.

12. The array controller as defined in claim 10 wherein said processor further comprises a microcontroller.

13. The array controller as defined in claim 10 wherein said disk interface further comprises a small computer system interface (SCSI).

14. The array controller as defined in claim 10 further comprising:
    an application specific integrated circuit (ASIC) coupled to said array controller bus, said ASIC adapted to generate said parity information using greater than four bit coefficients.

15. The array controller as defined in claim 14 wherein said ASIC further adapted to generate said parity information using eight bit coefficients.

16. The array controller as defined in claim 10 wherein said array controller bus further comprises a peripheral components interconnect (PCI) bus.

17. In a computer system having an array of storage devices coupled to an array controller capable of multiple device fault recovery, a method of operating the computer system comprising:

writing data from said computer system to said array controller;

dividing said data into a plurality of data subsets;

calculating error correction information based on values of each of the data subsets;

writing said data subsets and error correction information in a striped fashion across all the devices of the array of storage devices; and said calculating error correction information using coefficients whose values are represented by greater than four bits.

18. The method as defined in claim 17 wherein said calculating error correction information further comprises calculating said error correction information in an Application Specific Integrated Circuit (ASIC), said ASIC designed to perform error correction information calculation using coefficients whose values exceed values that may be represented by four bits.

19. The method as defined in claim 17 wherein said calculating error correction information further comprises using eight bit coefficients.

20. In an array controller having data to be stored on an array of storage devices, a method of operating said array controller comprising:

dividing said data into a plurality of data subsets;

calculating error correction information based on the value of each data subset;

writing said data subsets and error correction information in a striped fashion across all the devices of the array of storage devices; and said calculating error correction information using coefficients whose values are represented by greater than four bits.

21. The method as defined in claim 20 wherein said calculating error correction information further comprises calculating said information in an Application Specific Integrated Circuit (ASIC), said ASIC designed to perform error correction calculations using coefficients whose values may exceed values that may be represented by four bits.

22. The method as defined in claim 21 wherein said calculating error correction information further comprises using eight bit coefficients.

* * * * *